United States Patent
BuAbbud

(10) Patent No.: US 7,035,504 B2
(45) Date of Patent: Apr. 25, 2006

(54) DEEP FIBER NETWORK WITH HIGH SPEED DATA AND VIDEO ON DEMAND

(75) Inventor: George H. BuAbbud, Southlake, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 33 days.

(21) Appl. No.: 10/832,667

(22) Filed: Apr. 27, 2004

(65) Prior Publication Data

US 2004/0264964 A1 Dec. 30, 2004

Related U.S. Application Data

(63) Continuation of application No. 10/200,534, filed on Jul. 22, 2002, now Pat. No. 6,775,433.

(60) Provisional application No. 60/306,906, filed on Jul. 20, 2001.

(51) Int. Cl.
*G02B 6/28* (2006.01)

(52) U.S. Cl. .............................. 385/24; 385/16; 385/31; 398/141

(58) Field of Classification Search ............ 385/16–24, 385/31; 398/140, 141, FOR. 116, FOR. 128, 398/FOR. 145
See application file for complete search history.

(56) References Cited

U.S. PATENT DOCUMENTS

| 6,606,430 | B1 | 8/2003 | Bartur et al. | |
|---|---|---|---|---|
| 6,665,497 | B1 | 12/2003 | Hamilton-Gahart et al. | |
| 6,775,433 | B1 * | 8/2004 | BuAbbud | 385/24 |

\* cited by examiner

*Primary Examiner*—Phan T. H. Palmer
(74) *Attorney, Agent, or Firm*—Baker Botts L.L.P.

(57) ABSTRACT

Optical interface units are provided for transmitting data and video signals in a deep fiber network. The optical interface units may include a first type which is situated in a central location, such as at a host digital terminal in a central office location, and a second type which is situated near a subscriber location, such as at an optical network unit. The first type of optical interface unit combines downstream video signals at a first wavelength with downstream data signals at a second wavelength and also receives upstream data signals at the second wavelength. The second type of optical interface unit receives the transmissions from the first type of optical interface unit at the first wavelength and transmits the upstream data signals at the second wavelength. Various embodiments of the optical interface units are provided for extending the functionality of the network to provide high speed data and video on demand services.

20 Claims, 11 Drawing Sheets

DEEP FIBER NETWORK WITH HIGH SPEED DATA AND VIDEO ON DEMAND

CROSS-REFERENCE TO RELATED APPLICATIONS

This application is a continuation of Ser. No. 10/200,534, filed Jul. 22, 2002, now U.S. Pat. No. 6,775,433.

This application claims priority from and is related to U.S. Provisional Application No. 60/306,906 entitled "DFHFC With High Speed Data and VOD," which was filed on Jul. 20, 2001. The entire disclosure of U.S. Provisional Application No. 60/306,906 is hereby incorporated into the present application by reference.

BACKGROUND OF THE INVENTION

1. Technical Field

The present invention generally relates to methods and apparatus for carrying on communications over optical fibers. More specifically, the invention is directed to methods and apparatus to provide bi-directional telephonic communication and bi-directional digital data transmission such as digital subscriber line services and transmitting multicast TV.

2. Description of the Related Art

The communications industry is using more and more optical fibers in lieu of copper wire. Optical fibers have an extremely high bandwidth thereby allowing the transmission of significantly more information than can be carried by a copper wire transmission line such as twisted pairs or coaxial cable.

Of course, modern telephone systems require bi-directional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still used in older installations where telephony is the only required service. It is also often used even where digital transmission service is demanded as the signals get closer to the end users. Although twisted pairs and coaxial cables are used in homes and distribution terminals close to the home end user, some modern telecommunication systems now use microwave and optic fibers as transmission mediums.

Because of extremely high bandwidths available for use by an optical fiber, a single fiber is quite capable of carrying a great number of communications in both directions. One technique of optical transmission is WDM (wavelength divisional multiplexing) and uses different wavelengths for each direction of travel.

Another area of rapidly growing technology is providing unidirectional TV signals by cable to a multiplicity of subscribers or users (multicast). In the past, such signals were and still are typically transmitted by the use of coaxial cables (e.g. cable TV). However, the use of optical fibers for transmission allows broad band transmission to a large numbers of customers and, since substantially all of the transmission of TV signals is one way (i.e. unidirectional), if a single optical fiber were used solely for the TV signals there would be almost no use of the selected wavelength of light for carrying return signal, which are typically control or information signals.

SUMMARY OF THE INVENTION

A communication system for providing high speed data services to a subscriber using optical fibers is provided. The communication system comprises, a first optical interface unit (OIU) in a network node element and a second OIU in a optical node device. The first OIU comprises a first electrical-to-optical (E/O) circuit, a first optical-to-electrical (O/E) circuit, a first diplexer device, and a first modem. The first E/O circuit is operative to receive first electrical signals, convert the first electrical signals to first optical signals of a first wavelength, and transmit downstream on an optical fiber the first optical signals. The first O/E circuit is operative to receive second optical signals from the optical fiber, convert the second optical signals to second electrical signals, and to transmit the second electrical signals upstream. The first diplexer device is coupled between the optical fiber and the first E/O circuit and is also coupled between the optical fiber and the first O/E circuit. The first modem is coupled between the first O/E circuit and a high speed data source and is coupled between the first E/O circuit and the high speed data source for providing a high speed data path in the OIU.

The second OIU comprises a second E/O circuit, a second O/E circuit, a third O/E circuit, a first triplexer device, and a second modem. The second E/O circuit is operative to receive third electrical signals, convert the third electrical signals to the second optical signals of a second wavelength, and transmit upstream on the optical fiber the second optical signals. The second O/E circuit is operative to receive third optical signals of a third wavelength from the optical fiber, convert the third optical signals to fourth electrical signals, and to transmit the fourth electrical signals downstream to a subscriber. The third O/E circuit is operative to receive the first optical signals from the optical fiber, convert the first optical signals to fifth electrical signals, and to transmit the fifth electrical signals downstream to a subscriber. The first triplexer device is coupled between the optical fiber and the second E/O circuit, is coupled between the optical fiber and the second O/E circuit, and is coupled between the optical fiber and the third O/E circuit. The second modem is coupled between the third O/E circuit and a high speed data subscriber and between the second E/O circuit and the high speed data subscriber for providing a high speed data path in the second OIU.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
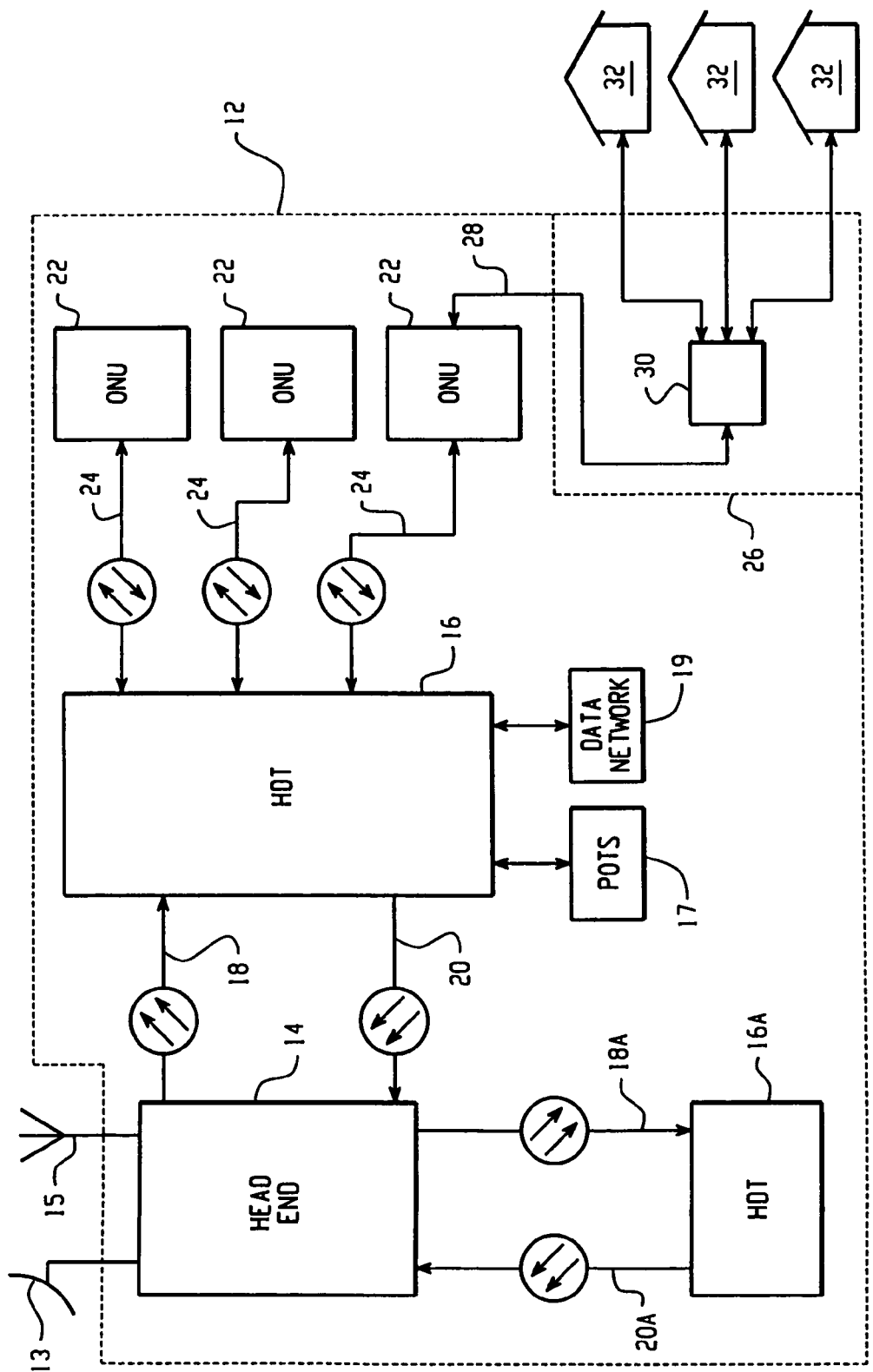
FIG. 1 is a block diagram of an exemplary HFC system.

Shown in FIG. 1 is a preferred embodiment of a fiber-to-the-curb (FTTC) communication system 10 for delivering residential and/or business telecommunication services over a hybrid fiber-coaxial (HFC) distribution network 12. This embodiment takes partial advantage of the existing telephone and coaxial TV distribution systems 26 while also using a single optical fiber 24 for part of the bi-directional telephone transmission (POTS) as well as part of the transmission path between a video source location 14 and a building or home 32. The exemplary communication system 10 comprises a cable head-end 14, one or more network nodes such as host digital terminals or points-of-presence 16, optical fibers 18, 20 that provide communication paths between the host digital terminal and the cable head-end, a plurality of optical node devices 22, optical fibers 24 that provide communication paths between the optical node devices 22 and the host digital terminal 16, and coaxial distribution plants 26 that comprise coaxial and other copper cables 28 and splitters/amplifiers 30 that are used to distribute signals to homes and/or businesses 32 that subscribe to services provided by the communication system 10. It should be noted that, although the following discussion is in terms of a single direct path for the coaxial and optical fiber cable between two locations 14 and 32, in actuality there will be a significant amount of multiplexing and de-multiplexing such that many subscribers or customers may be serviced by the single optical fiber and other multiplexed cables. It should also be noted that there might also be several amplification stations located at various locations in the distribution path. Further, as is shown, in addition to the optical fibers 18 and 20 traveling between the head end 14 and the HDT 16, there will be other optical fibers as indicated by optical fibers 18A and 20A that extend between the head end 14 and other HDTs 16A.

The cable head-end 14 provides the communication system 10 with video programming, such as television (TV) programming or video on demand, that is to be passed on to subscribers and may also provide cable modem services to subscribers. In distributing cable television services, the head-end 16 preferably includes a satellite dish antenna 13 and/or a radio frequency (RF) antenna 15 for receiving incoming programming. The head-end 16 may also include equipment to play videotapes and/or to originate live programming that is passed on to subscribers. Most signals are sent downstream to the subscriber, but some signals are received upstream such as when a customer requests a pay-per-view program. When a cable company provides Internet access to subscribers, the head-end often includes the computer system and databases needed to provide Internet access. A Cable Modem Termination System (CMTS) is typically located at the head end, which sends and receives digital cable modem signals on a cable network and is necessary for providing Internet services to cable subscribers.

A cable modem termination system (CMTS) is a component that exchanges digital signals with cable modems on a cable network. When a CMTS receives signals from a cable modem, it converts these signals into Internet Protocol (IP) packets, which are then sent to an IP router for transmission across the Internet. When a CMTS sends signals to a cable modem, it modulates the downstream signals for transmission across the cable to the cable modem. All cable modems can receive from and send signals to the CMTS but not to other cable modems on the line.

In the exemplary communication system 10, the head end 14 passes programming and cable modem signals in the downstream direction to one or more host digital terminals (HDTs) 16 via an optical fiber(s) 18. The head end 14 receives cable modem signals and other signals in the upstream direction from the HDT(s) 16 via an optical fiber(s) 20. In addition to having a connection to the head end 14 for receiving programming and exchanging cable modem signals, the HDT also preferably includes a connection to the plain old telephone service (POTS) 17 and optionally a connection to a data network 19. The HDT 16 is preferably coupled to a plurality of optical node devices 22 such as optical network units (ONUs) 22 via optical fibers 24 wherein a single fiber couples a single ONU 22 to a HDT 16. Signals collected by the HDT 16 are collected and multiplexed onto a single optical fiber to be transmitted to an ONU 22. The HDT 16 also receives optical signals from the ONUs 22, demultiplexes the signals and transmit the signals to their proper destination, i.e., the head end 14, the POTS system 17, or the data network 19.

Exemplary HFC Network Architecture

Figure 2:
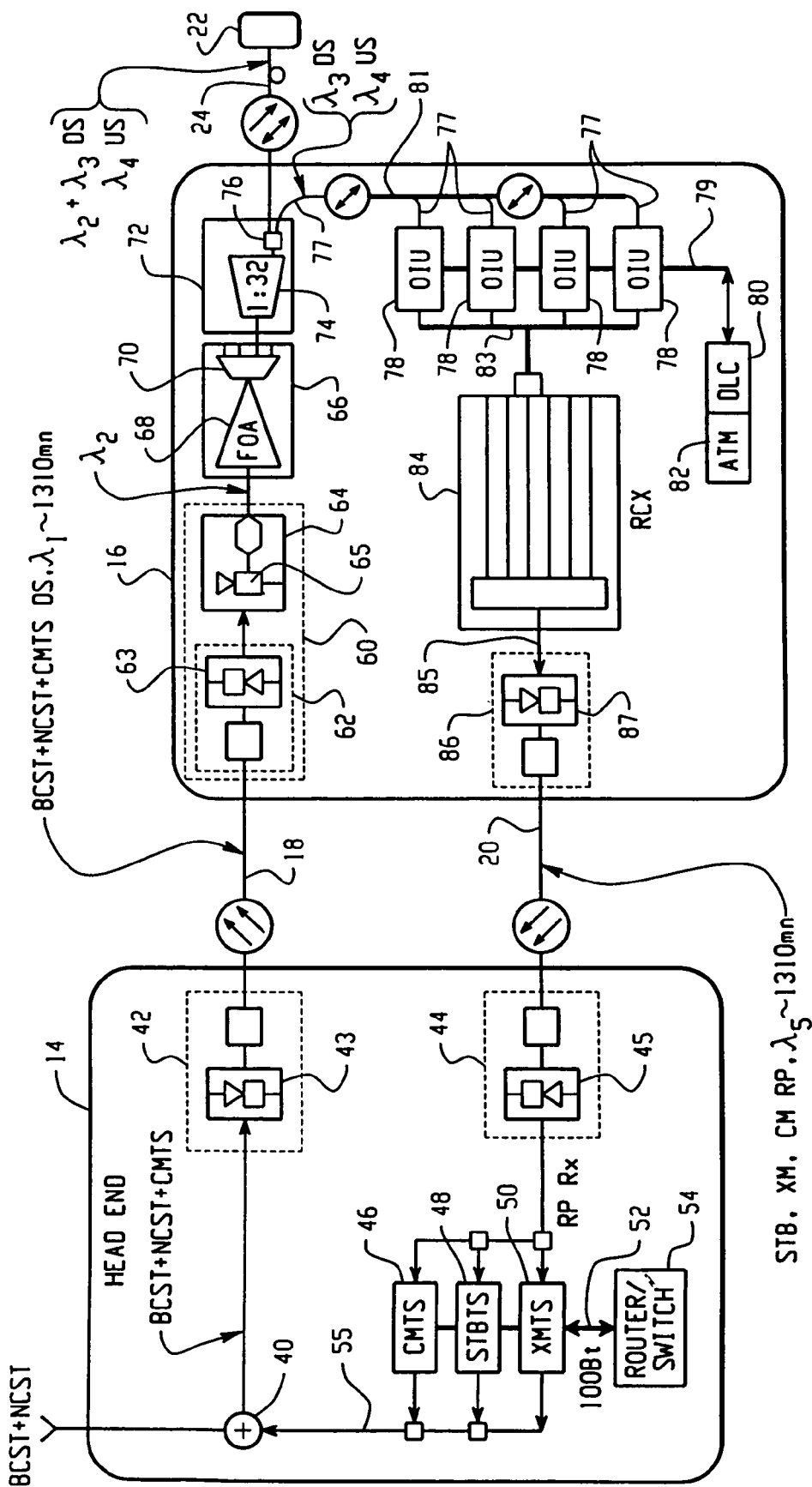
FIG. 2 is a more detailed diagram of a HFC system that shows an exemplary head end and exemplary HDT.

Referring now to FIG. 2, shown in more detail is an exemplary portion of a HFC network that includes a head end 14 and a network node 16. The head end shown is preferably located at a central office (CO) and the network node 16 is preferably a HDT or POP located at a CO. The head end 14 preferably includes an electrical signal combining device 40 such as an adder, an electrical-to-optical (E/O) converter device 42, an optical-to-electrical (O/E) converter device 44, a cable modem transmission system (CMTS) 46, a set top box transmission system (STBTS) 48, an XMTS 50, and a communication link 52 for connection to a router/switch 54 that provides communication paths to a data communication network. The head end 14 and the HDT 16 cooperate to send signals downstream (DS) from the head end 14 to the ONU 22 (and ultimately to a subscriber's home or business location). The head end 14 and the HDT 16 also cooperate to send signals (that originate from a subscriber's home or business location) upstream (US) on a return path (RP) from the ONU 22 to the HDT 16 and finally to the head end.

In the DS path in the head end 14, the electrical signal-combining device 40 receives electrical signals that are to be transmitted to subscribers and combines them in the frequency domain. Preferably the electrical signal combining device 40 receives broadcast cable signal transmissions (BCST) and narrow-cast cable signal transmissions (NCST), such as pay-per-view stations, combines these cable signals with cable modem transmission signals from the CMTS 46, and forwards the combined signals to the E/O converter device 42. The E/O converter device 42 preferably includes a laser diode 43 that is used to convert the combined electrical signals to a light wave signal at a wavelength $\lambda_1$ that can be transported downstream over the optical fiber 18 to the HDT 16. In the embodiment shown in FIG. 2, the signals are transmitted over the optical fiber 18 at a wavelength $\lambda_1$ in the 1310 nm (nano-meters) window.

In the US path in the head end 14, the O/E converter device 44 receives signals at a wavelength $\lambda_5$ from the HDT 16 via the optical fiber 20. In the embodiment shown in FIG. 2, the RP signals are transmitted over the optical fiber 20 at a wavelength $\lambda_5$ in the 1310 nm window. The RP signals preferably include set top box (STB) signals, XM signals, and cable modem (CM) signals. The O/E converter device 44, which preferably includes a photo diode 45, converts the light wave signal at the wavelength $\lambda_5$ to electrical signals. The converted electrical signals are forwarded to the appropriate termination system, the CMTS 46, the STBTS 48, or the XMTS 50. The termination systems 51 preferably have a high bandwidth link 52 to a Router/Switch 54 for exchanging data with a public network such as an IP network. The high bandwidth link 52 in the example of FIG. 2 is a 100 Bt Ethernet link, however, other communication links could be used such as a Gigabit Ethernet link and others. The termination systems 51 also preferably have a communication path 55 to the electrical signal-combining device 40 for sending signals downstream over the DS path.

In the DS path in the HDT 16, a signal modification device 60 is preferably provided that comprises an O/E converter 62 and an E/O converter 64. The O/E converter 62 preferably includes a photo diode 63 for converting optical signals received from the head end 16 via the optical fiber 18 to electrical signals. The E/O converter 64 preferably includes a laser diode 65 for converting electrical signals to optical signals at a wavelength $\lambda_2$ where the wavelength $\lambda_2$ may or may not be equal to the wavelength $\lambda_1$. In the embodiment shown, the wavelength $\lambda_2$ is preferably in the 1550 nm window. The signal modification device 60 is not required for the DS path in this embodiment but is preferably used to allow for local signals to be inserted into the DS path to an ONU. After producing optical signals at the wavelength $\lambda_2$, the optical signals are forwarded to a fiber optic amplifier/splitter stage 66 that preferably includes a fiber optical amplifier (FOA) 68 and a splitter 70. The fiber optic amplifier/splitter stage 66 amplifies the optical signals at wavelength $\lambda_2$, splits the amplified optical signals into a plurality of split optical signals and forwards each split optical signal to a separate splitter wavelength division multiplexer cross-connect (SWX) 72. In the embodiment shown the splitter 70 is a 1:4 splitter, however, other splitters, such as a 1:8 splitter, could be used.

Shown in FIG. 2 is one such SWX 72, however, a plurality of SWXs preferably is provided. The SWX 72 preferably includes a splitter 74 that has a plurality of outputs (32 are shown in this embodiment). Each output of the splitter 74 is paired with a wavelength division multiplexer (WDM) stage 76. Shown in FIG. 2 is one such output/WDM pair, however, a plurality of output/WDM pairs is preferably provided. The WDM stage 76 combines the optical signals at wavelength $\lambda_2$ that are received from the splitter 74 with optical signals at wavelength $\lambda_3$ that are generated by one of the optical interface units (OIUs) 78 and forwards the combined multi-wavelength signals to an ONU 22 via an optical fiber 24. The OIUs 78 preferably have a public network communication path 79 to a public network via, for example, a digital loop carrier (DLC) 80 and an ATM network 82 for providing POTS (plain old telephone services) and/or data, such as DSL services, to subscribers. Consequently the OIUs 78, via an optical signal on a single fiber 77, can forward POTS and data signals from the public network to subscribers from the group of fibers 81. In the embodiment shown, the wavelength $\lambda_3$ is preferably in the 1310 nm window. Each WDM stage 76 preferably exchanges signals with a single OIU 78 via an optical fiber 77 and exchanges signals with a single ONU 22 via an optical fiber 24. Consequently, preferably there is a single WDM stage 76 corresponding to each OIU 78, and each WDM/OIU pair can exchange signals with a single ONU 22.

In the US path from the ONU 22, optical signals at a wavelength $\lambda_4$ are transmitted from the ONU 22 to the associated OIU 78 via a single optical fiber 24 and a single optical fiber 77. Each ONU 22 communicates with a single OIU 78. In the embodiment shown, the wavelength $\lambda_4$ is approximately equal to the wavelength $\lambda_3$, which is preferably in the 1310 nm window. The light signals in the 1310 nm window are able to travel in both directions on the single fiber optic cable 24 and single fiber optic cable 77. Each OIU 78 receives optical signals, converts the optical signals to electrical signals, and forwards the electrical signals to the appropriate destination. For example, POTS signals are transmitted to the public network via the public network communication path 79, the DLC 80, and the ATM network 82. STB, XM, and CM signals are forwarded by the OIUs via a plurality of copper wires 83 to the return path combiner cross-connect (RCX) 84. There is a separate copper wire 83 for each OIU 78 that electrically couples that OIU 78 to the RCX 84. The RCX 84 multiplexes the signals coming over the plurality of copper wires 78 onto a single line 85. The RCX 84 combines multiple signals from multiple OIUs 78 into one signal on one cable 85. The multiplexed signals are provided to a return path (RP) transmitter 86 that includes a laser diode 87 for converter the RP electrical signals to RP optical signals for transmission over optical fiber 20 to the head end 14. In the embodiment shown, the RP optical signals are at a wavelength $\lambda_5$ wherein the wavelength $\lambda_5$ is preferably in the 1310 nm window.

Exemplary OIU Embodiments for Providing POTS at HDT/POP

Figure 3A:
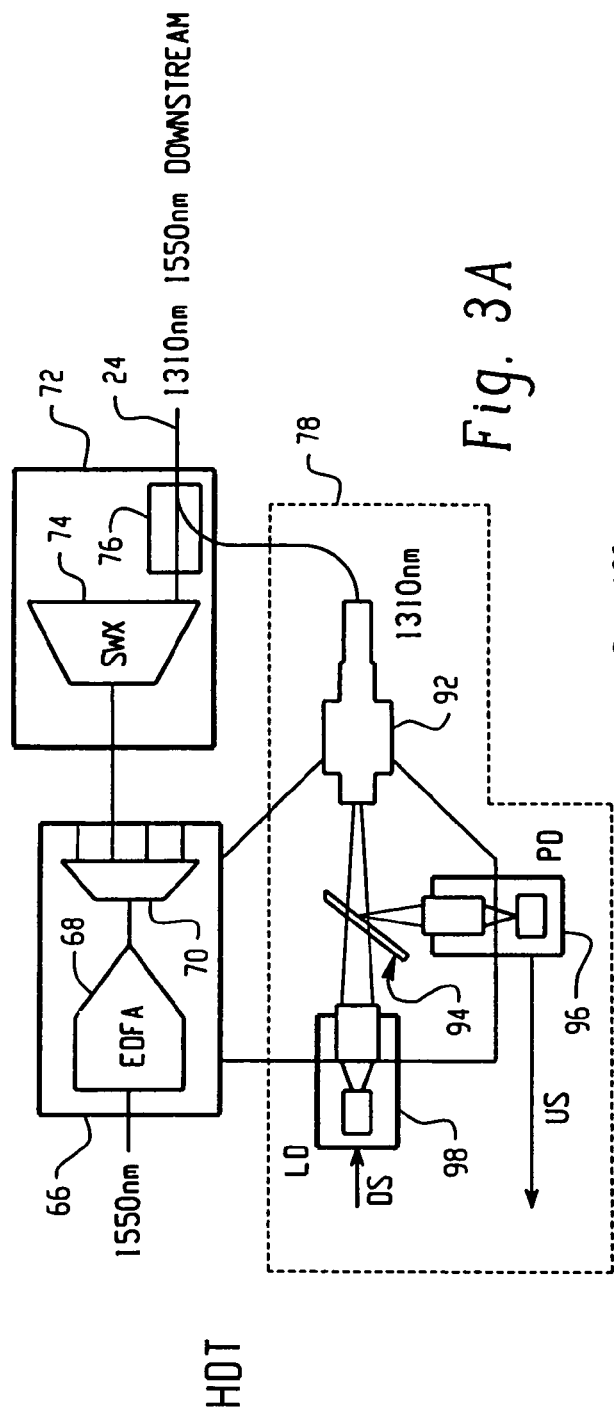
FIG. 3A is a schematic diagram illustrating a first embodiment of an OIU in a HDT.
Figure 3B:
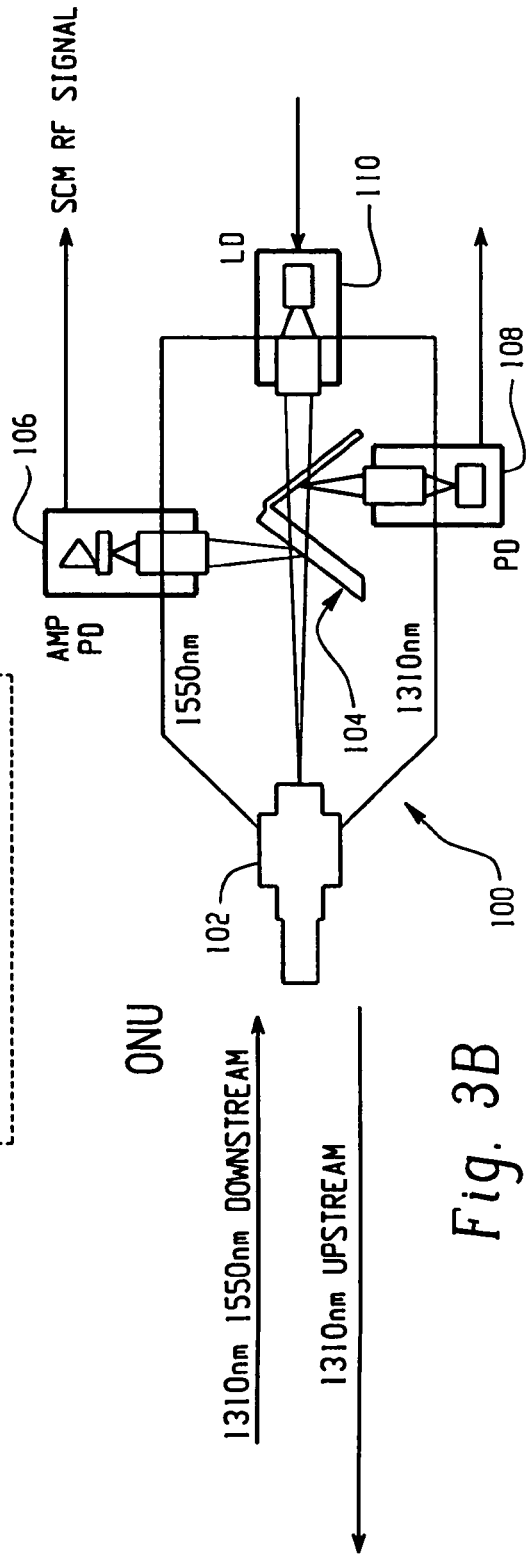
FIG. 3B is a schematic diagram illustrating a first embodiment of an OIU in an ONU.

Referring now to FIGS. 3A and 3B, illustrated are exemplary portions of optical interface units (OIUs) associated with exemplary digital terminal equipment (FIG. 3A) and optical node devices (FIG. 3B). With reference to FIG. 3A, optical signals at the wavelength $\lambda_2$, which in this example is in the 1550 nm window, are passed to a fiber optic amplifier/splitter stage 66, wherein in this example the FOA is an erbium doped fiber amplifier (EDFA). The fiber optic amplifier/splitter stage 66 amplifies the optical signals at wavelength $\lambda_2$, splits the amplified optical signals into a plurality of split optical signals and forwards each split optical signal to a separate splitter wavelength division multiplexer cross-connect stage (SWX) 72. The SWX 72 preferably includes a splitter 74 and a plurality of wavelength division multiplexer (WDM) stages 76. The WDM stage 76 combines the optical signals at wavelength $\lambda_2$ with optical signals at wavelength $\lambda_3$ (which in this example is in the 1310 nm window) that are generated by one of the optical interface units (OIUs) 78 and forwards the combined multi-wavelength signals to an ONU 22 via an optical fiber 24.

Figure 3C:
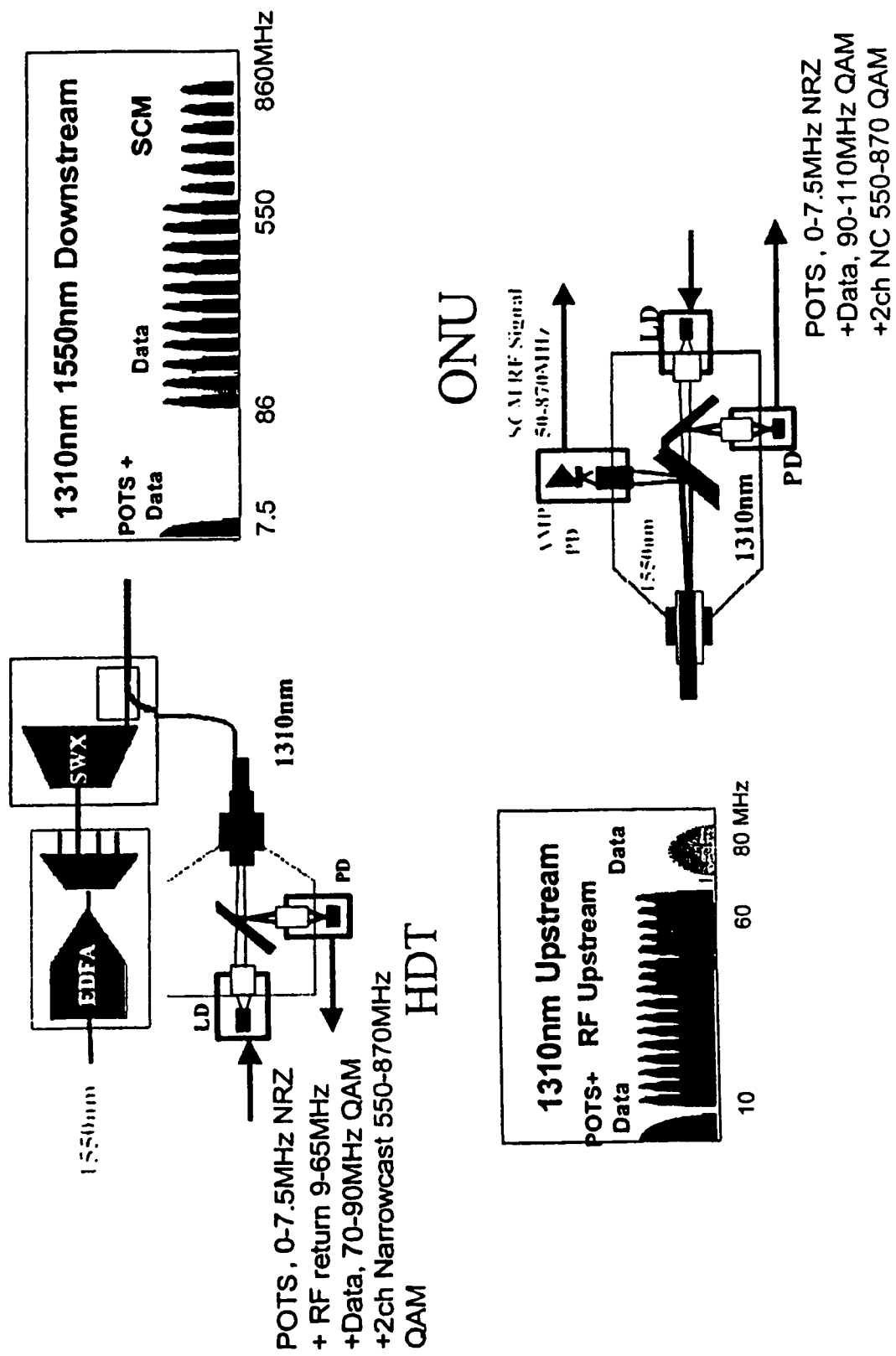
FIG. 3C is a schematic diagram illustrating an exemplary signal spectrum for signals transmitted and received by the OIUs in the HDT and ONU.

As illustrated, the OIU 78 comprises an optical coupler 92, a diplexer 94, an O/E converter 96 that includes a photo diode (PD), and an E/O converter 98 that includes a laser diode (LD). DS signals such as POTS signals are provided to the E/O converter 98 where they are converted to optical signals at wavelength $\lambda_3$. The optical signals are then passed in turn to the diplexer 94, the optical coupler 92, and the WDM stage 76 for transmission to an ONU 22. As illustrated in FIG. 3C, the signals modulated as optical signals at wavelengths $\lambda_2$ and $\lambda_3$ preferably include POTS at 0–7.5 MHz in the electrical domain, high bandwidth data at 90–110 MHz, and subcarrier modulation (SCM) data such as narrow-cast programming at 550–870 MHz.

In the upstream direction, optical signals at wavelength $\lambda_4$ that are received from an ONU 22 are passed in turn to the WDM stage 76, the optical coupler 92, the diplexer 94, and the O/E converter 96. The O/E converter 96 converts the optical signals to electrical signals where they can be further processed. As illustrated in FIG. 3C, the signals that could be modulated as an optical signal at wavelength $\lambda_4$ include POTS at 0–7.5 MHz in the electrical domain, high bandwidth data at 70–90 MHz, RF return from a cable modem or set top box at 9–65 MHz, and Narrow-cast data at 500–870 Mhz.

With reference to FIG. 3B, the ONU also comprises an OIU. An exemplary OIU 100 in the ONU comprises an optical coupler 102, a diplexer 104, a first O/E converter 106, a second O/E converter 108, and an E/O converter 110. In the downstream direction from the HDT, the OIU 100 receives signals at different wavelengths $\lambda_2$ and $\lambda_3$. In this example, optical signals in the 1550 nm window are received at the optical coupler 102, forwarded to the triplexer 104, and routed to the first O/E converter 106 where the signals are converted to electrical signals and forwarded for further processing. Optical signals in the 1310 nm window are received at the optical coupler 102, forwarded to the diplexer 104, and routed to the second O/E converter 108 where the signals are converted to electrical signals and forwarded for further processing. In the upstream direction, electrical signals are received by the E/O converter 110 where they are converted to optical signals at wavelength $\lambda_4$. The optical signals are then passed in turn to the triplexer 104 and the optical coupler 102 for transmission upstream to the HDT.

Figure 4:
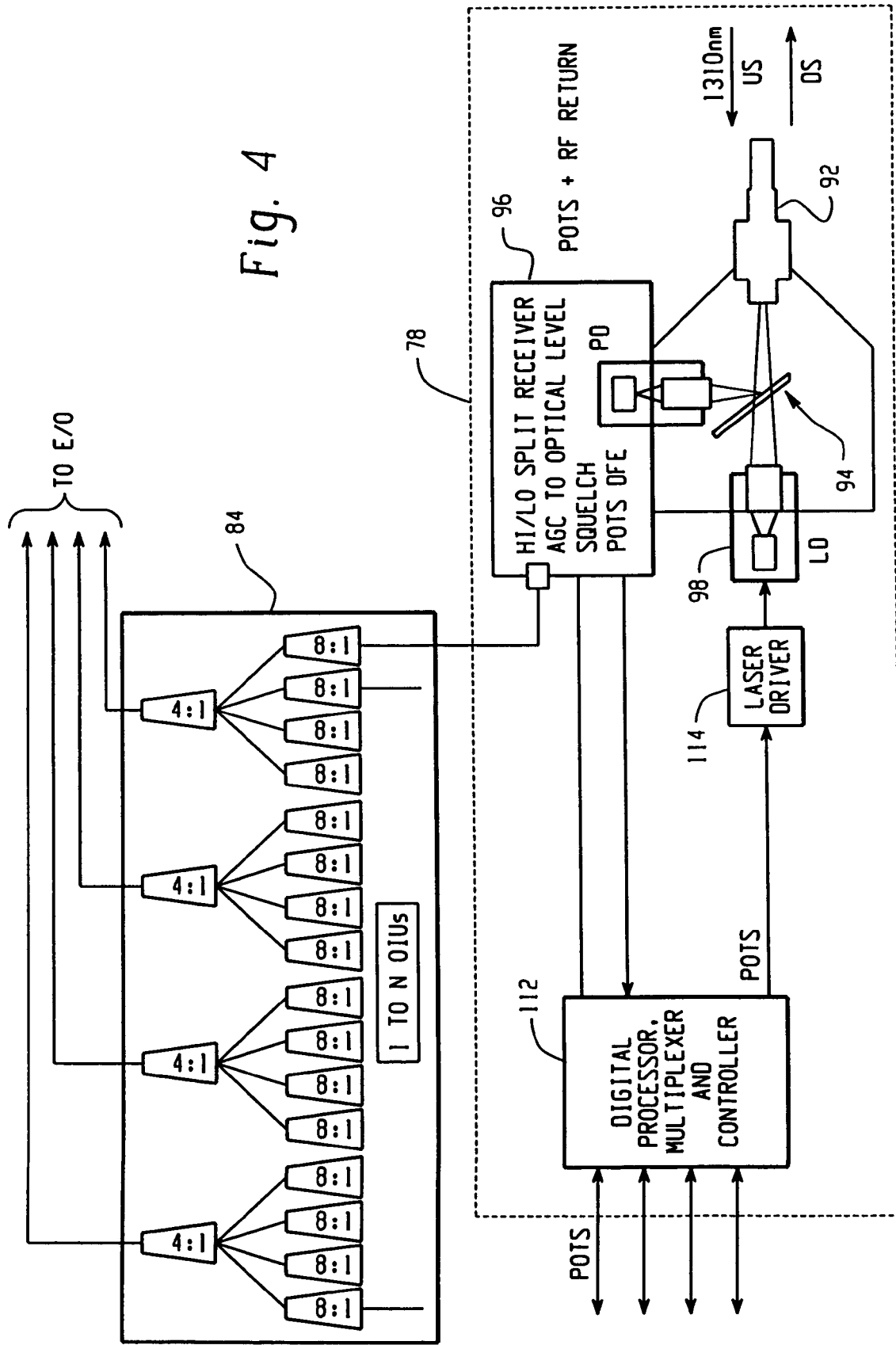
FIG. 4 is a more detailed schematic diagram illustrating a first embodiment of an OIU in a HDT.

Referring now to FIG. 4, a controller circuit 112 is provided in the HDT OIU 78 for interfacing with a POTS source and for providing POTS signals from the POTS source to a laser driver 114. The signal output from the laser driver 114 is fed to the laser diode in the E/O converter 98 for conversion to optical signals and for transmission downstream to the ONU. POTS signals flowing upstream from the ONU are received and directed to the O/E converter 96, which converts the optical signals to electrical signals and forwards the signals to the controller circuit 112. The controller circuit 112 processes the signals and forwards them to the POTS source. RF signals flowing upstream from the ONU are received and directed to the O/E converter 96, which converts the optical signals to electrical signals and forwards the signals to the RCX 84 for combination with signals from other OIUs 78 for forwarding to a return path (RP) transmitter for transmission over an optical fiber to a head end.

Figure 5:
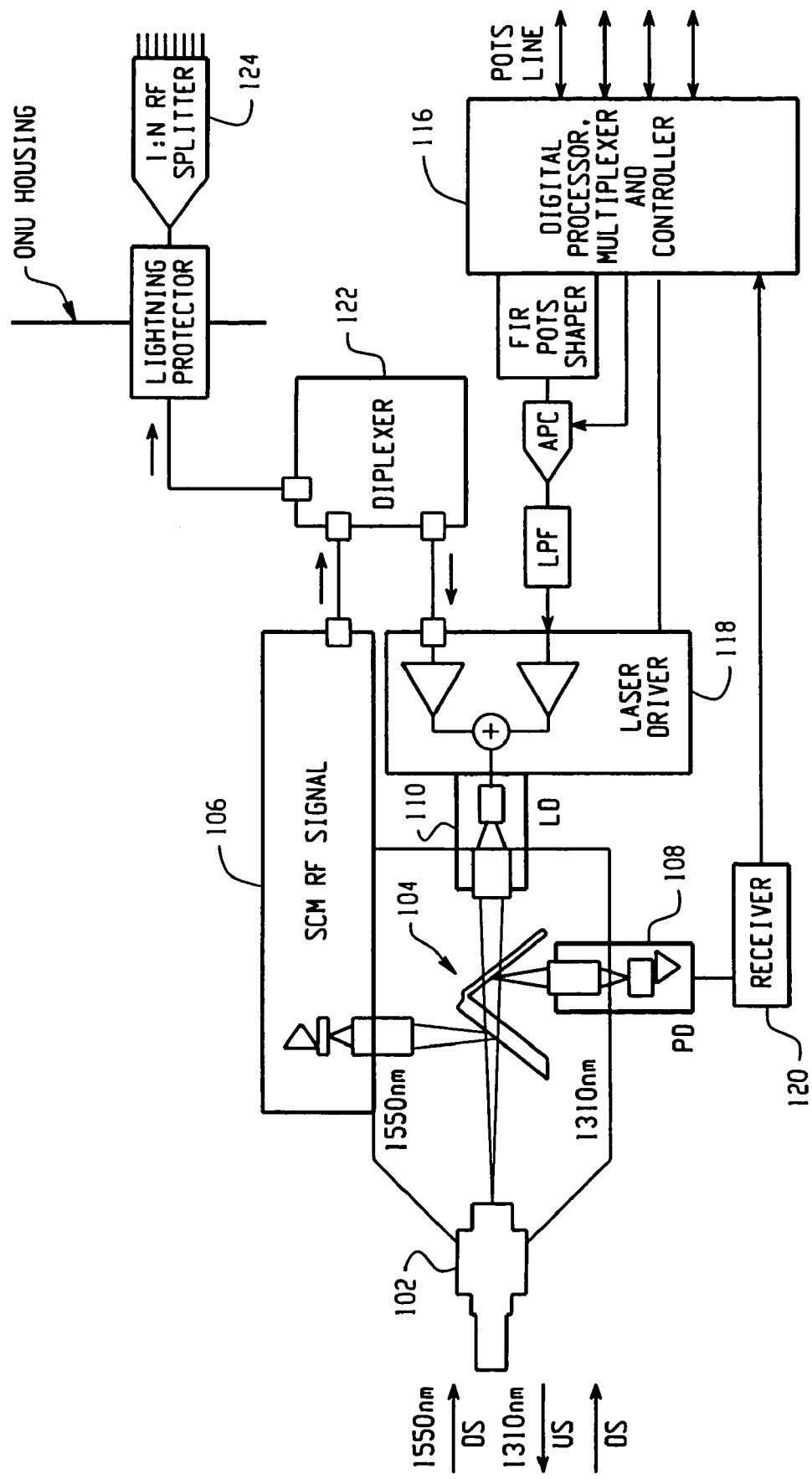
FIG. 5 is a more detailed schematic diagram illustrating a first embodiment of an OIU in a ONU.

Referring now to FIG. 5, a controller circuit 116 is provided in the ONU OIU 100 for interfacing with a POTS line and for providing POTS signals from the POTS line to a laser driver 114. The signal output from the laser driver 118 is fed to the laser diode in the E/O converter 110 for conversion to optical signals and for transmission downstream to the HDT. POTS signals flowing downstream in the 1310 nm window from the HDT are received and directed to the second O/E converter 108, which converts the optical signals to electrical signals and forwards the signals to a receiver 120 and then to the controller circuit 116. The controller circuit 116 processes the signals and forwards them to the POTS line. RF signals flowing downstream with the optical signals in the 1550 nm window from the HDT are received and directed to the first O/E converter 106, which converts the optical signals to electrical signals and forwards the signals to the diplexer 122 for forwarding by cable to a splitter 124 and/or subscribers. RF signals flowing upstream from subscribers are received and directed to the diplexer 122 and then forwarded to the laser driver 118. The signal output from the laser driver 118 is fed to the laser diode in the E/O converter 110 for conversion to optical signals and for transmission downstream with the optical signals in the 1310 nm window to the HDT.

Alternative Embodiment for Providing POTS and High Speed Data at HDT/POP

Figure 6:
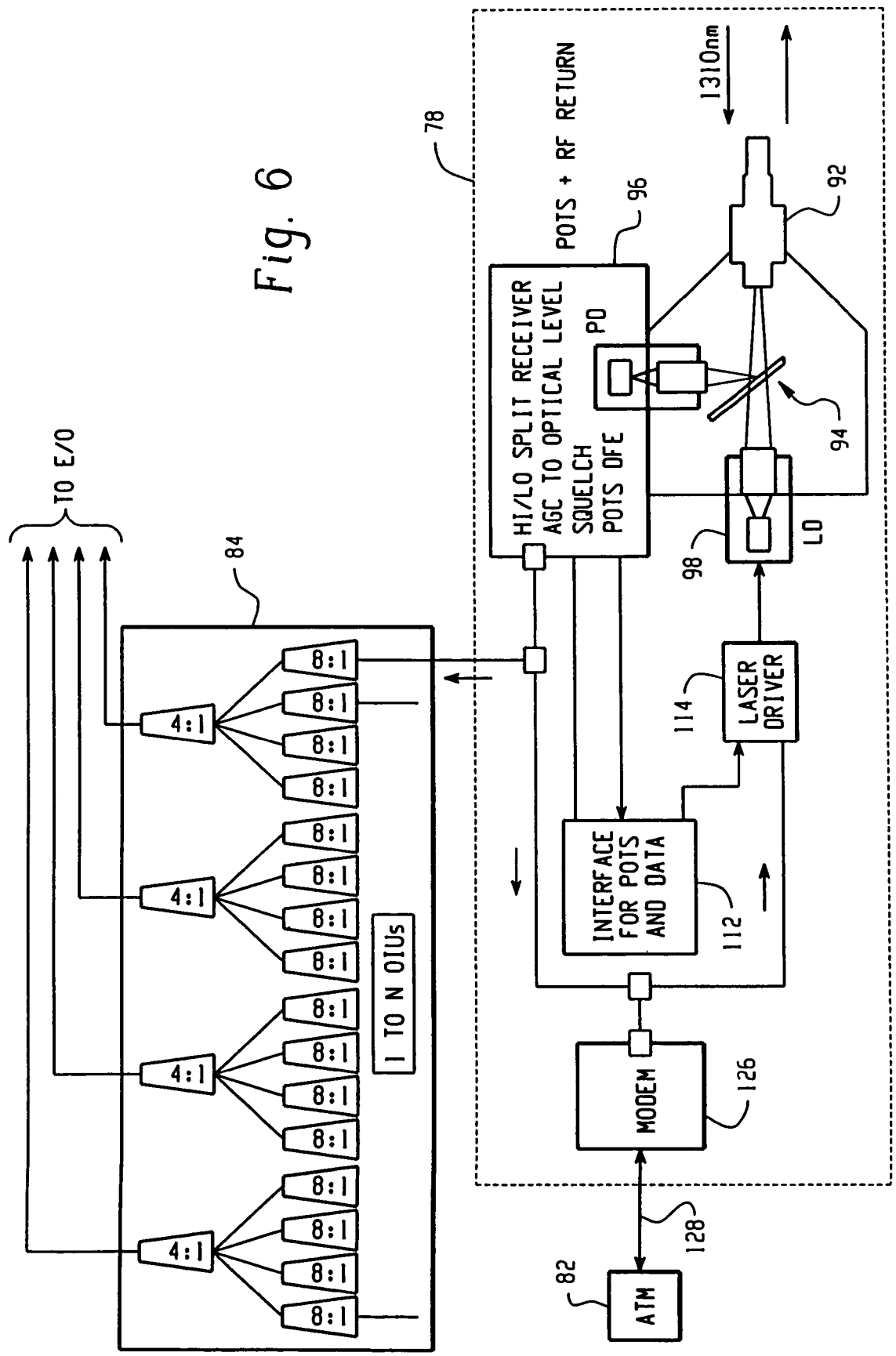
FIG. 6 is a schematic diagram illustrating a first alternative embodiment of an OIU in a HDT.

Referring now to FIG. 6, to provide the communication network with high speed data services, a modem 126 is provided in the HDT OIU 78 for interfacing with a link 128 to a high speed data network (for example, via an ATM network connection 82). The modem 126 directs high speed data from the link 128 to the laser driver 114. The signal output from the laser driver 114 is fed to the laser diode in the E/O converter 98 for conversion to optical signals and for transmission downstream to the ONU with the optical signals in the 1310 nm window. High Speed data flowing upstream from the ONU with the optical signals in the 1310 nm window are received and directed to the O/E converter 96, which converts the optical signals to electrical signals and forwards the signals to the modem 126. The modem 126 then transmits the high speed data via the link 128 to the high speed data network. POTS data and cable programming data are handled in the HDT in a manner similar to that described with reference to FIG. 4.

Figure 7:
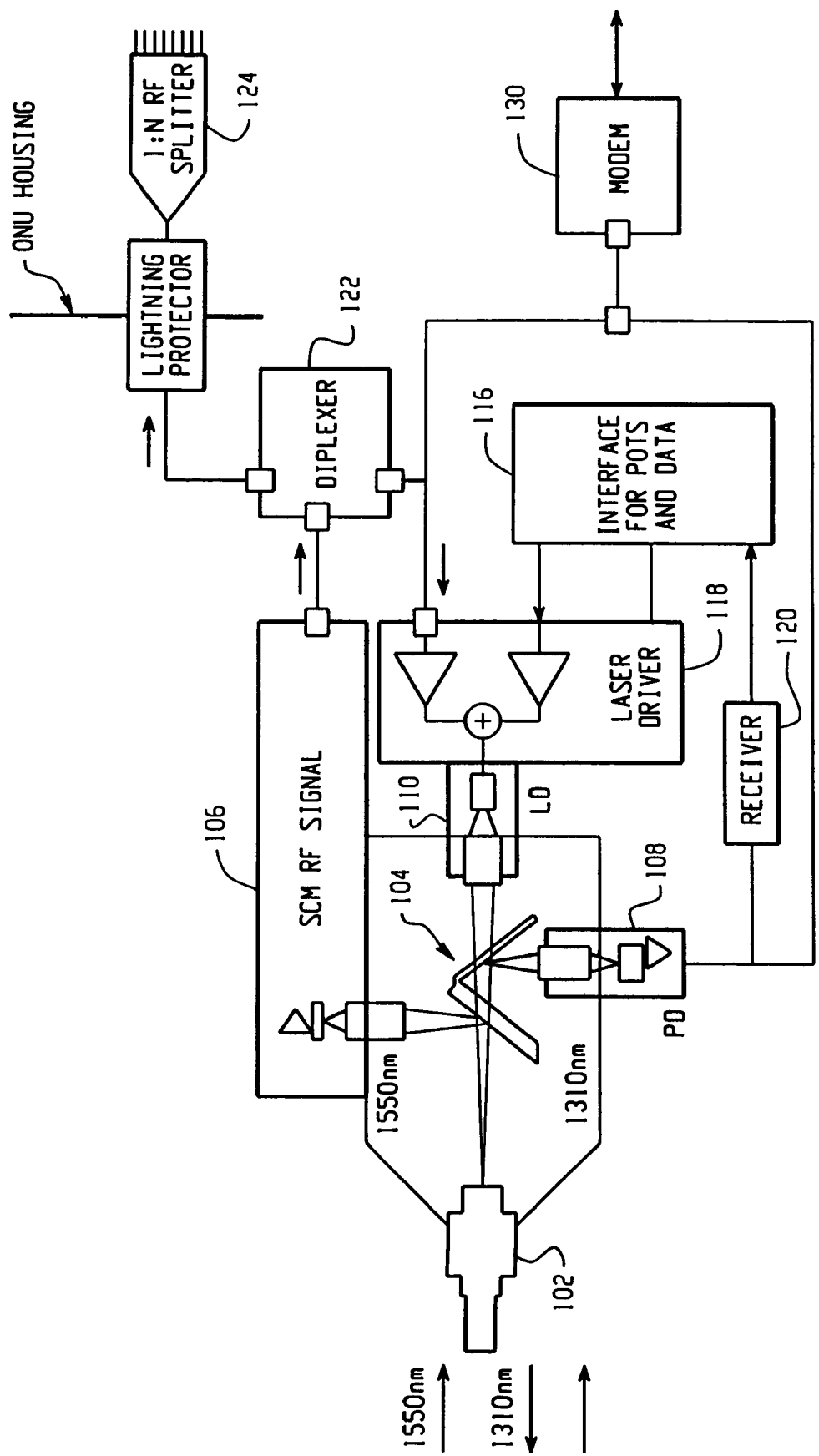
FIG. 7 is a schematic diagram illustrating a first alternative embodiment of an OIU in an ONU.

Referring now to FIG. 7, to provide the ONU with high speed data services, a modem 130 is provided in the ONU OIU 100 for linking with subscribers to provide the high speed data services to the subscribers. High speed data received from the downstream optical signals in the 1310 nm window are directed to the second O/E converter 108, which converts the optical signals to electrical signals and forwards the signals to the modem 130. The modem 130 processes the signals and forwards them to subscribers. High speed data signals flowing upstream from subscribers are received by the modem 130 and directed to the laser driver 118. The signal output from the laser driver 118 is fed to the laser diode in the E/O converter 110 for conversion to optical signals and for transmission downstream with the optical signals in the 1310 nm window to the HDT. POTS data and cable programming data are handled in the HDT in a manner similar to that described with reference to FIG. 4.

Alternative Embodiment for Providing High Speed Data and VOD at HDT/POP

Figure 8:
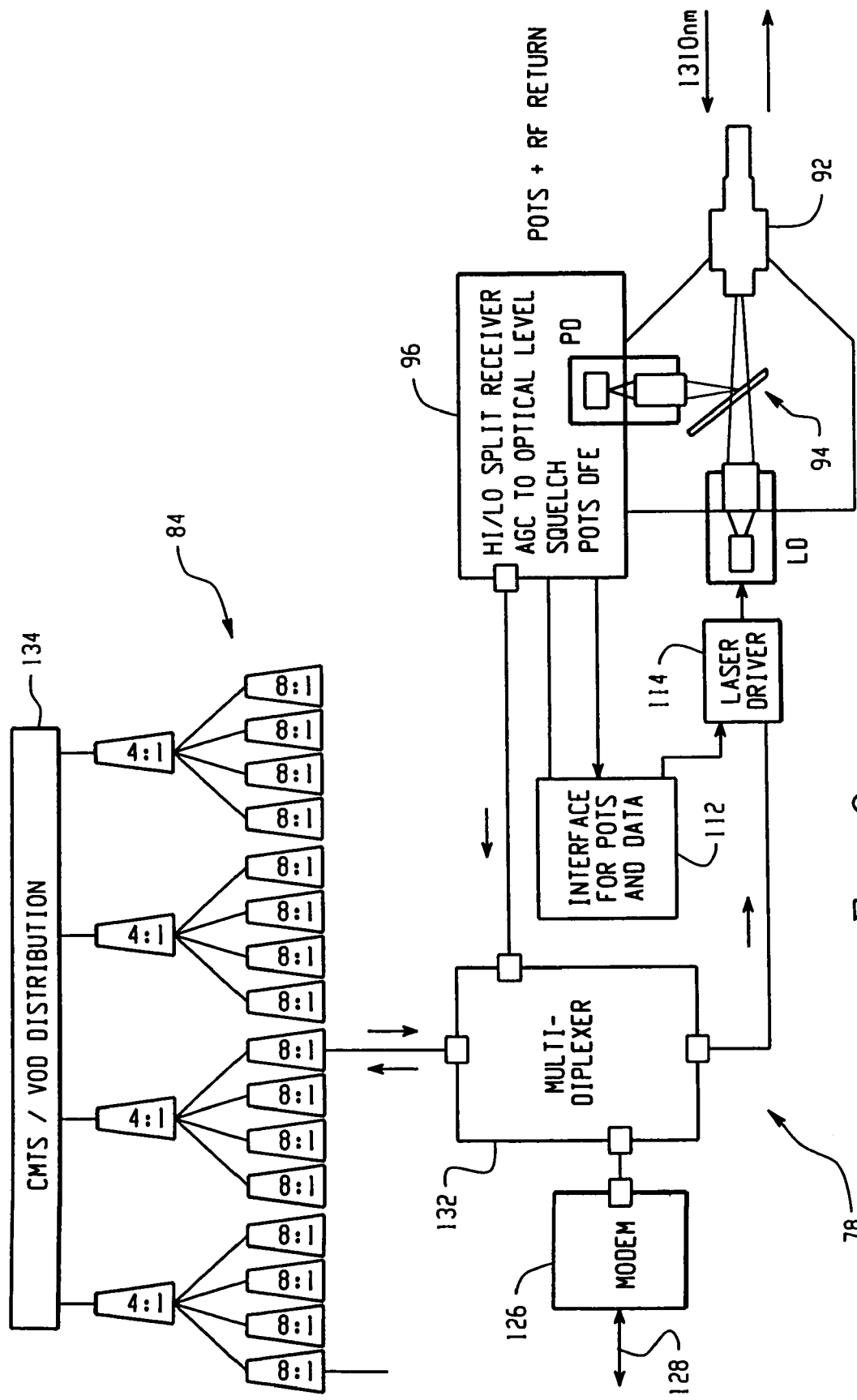
FIG. 8 is a schematic diagram illustrating a second alternative embodiment of an OIU in a HDT.

Referring now to FIG. 8, to provide the communication network with video on demand (VOD) services in addition to high speed data services, a multi-diplexer 132 is provided in the HDT OIU 78. The modem 126 directs high speed data from the link 128 to the multi-diplexer 132. The multi-diplexer 132, in turn, sends the high speed data from the link 128 to the laser driver 114. The signal output from the laser driver 114 is fed to the laser diode in the E/O converter 98 for conversion to optical signals and for transmission downstream to the ONU the optical signals in the 1310 nm window. High Speed data flowing upstream from the ONU the optical signals in the 1310 nm window are received and directed to the O/E converter 96, which converts the optical signals to electrical signals and forwards the signals to the multi-diplexer 132. The multi-diplexer 132, in turn, sends the high speed data to the modem 126. The modem 126 then transmits the high speed data via the link 128 to the high speed data network. POTS data is handled in the HDT in a manner similar to that described with reference to FIG. 4.

RF signals flowing upstream from the ONU as a part of the optical signals in the 1310 nm window are received and directed to the O/E converter 96, which converts the optical signals to electrical signals and forwards the signals to the multi-diplexer 132. The multi-diplexer 132, in turn, sends the high speed data to the RCX 84 for combination with signals from other OIUs 78 for forwarding to a CMTS/VOD Distribution system 134. RF signals flowing downstream from the CMTS/VOD Distribution system 134, such as signals containing video on demand signals, are routed from the CMTS/VOD Distribution system 134 to the RCX 84 and then to the multi-diplexer 132. The multi-diplexer 132, in turn, sends the VOD signals to the laser driver 114. The signal output from the laser driver 114 is fed to the laser diode in the E/O converter 98 for conversion to optical signals and for transmission downstream to the ONU the optical signals in the 1310 nm window.

Figure 9:
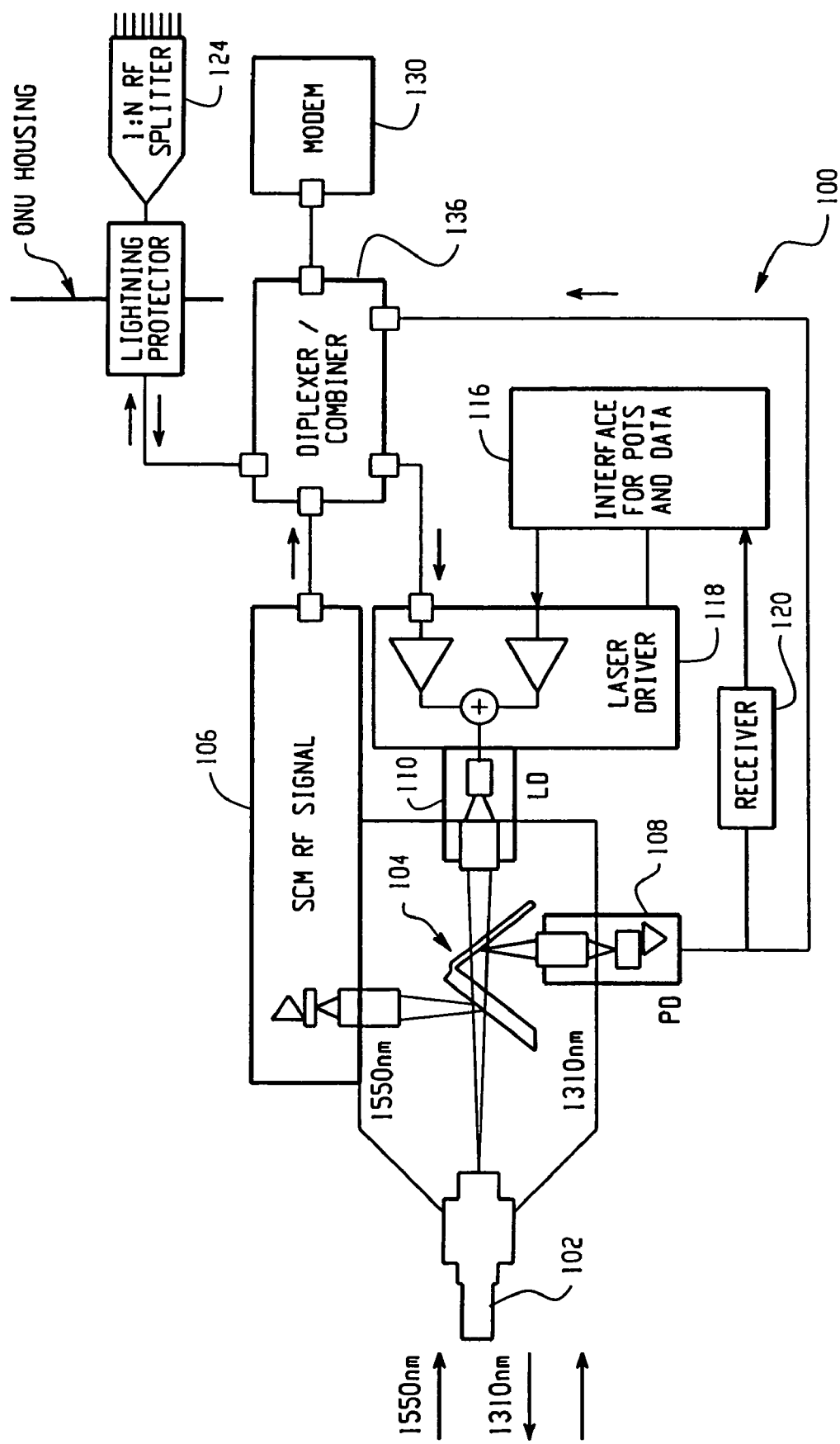
FIG. 9 is a schematic diagram illustrating a second alternative embodiment of an OIU in an ONU.

Referring now to FIG. 9, to provide the ONU with video on demand (VOD) services in addition to high speed data services, a diplexer/combiner 136 is provided in the ONU OIU 100. High speed data received from the downstream optical signals in the 1310 nm window are directed to the second O/E converter 108, which converts the optical signals to electrical signals and forwards the signals to the diplexer/combiner 136. The diplexer/combiner 136 passes the signals to the modem 130. The modem 130, in turn, forwards the signals to subscribers. High speed data signals flowing upstream from subscribers are received by the modem 130 and directed to the diplexer/combiner 136. The diplexer/combiner 136 forwards the high speed data to the laser driver 118. The signal output from the laser driver 118 is fed to the laser diode in the E/O converter 110 for conversion to optical signals and for transmission downstream the optical signals in the 1310 nm window to the HDT. POTS data is handled in the HDT in a manner similar to that described with reference to FIG. 4.

RF signals flowing downstream the optical signals in the 1550 nm window from the HDT, such as cable programming signals, are received and directed to the first O/E converter 106, which converts the optical signals to electrical signals and forwards the signals to the diplexer/combiner 1362. RF signals flowing downstream the optical signals in the 1310 nm window from the HDT, such as VOD signals, are received and directed to the second O/E converter 108, which converts the optical signals to electrical signals and forwards the signals to the diplexer/combiner 136. The diplexer/combiner 136 combines the VOD signals and the cable programming signals in the electrical domain and forwards the combined signals by cable to a splitter 124 and/or subscribers. RF signals flowing upstream from subscribers are received and directed to the diplexer/combiner 136 and then forwarded to the laser driver 118. The signal output from the laser driver 118 is fed to the laser diode in the E/O converter 110 for conversion to optical signals and for transmission downstream the optical signals in the 1310 nm window to the HDT.

Figure 10:
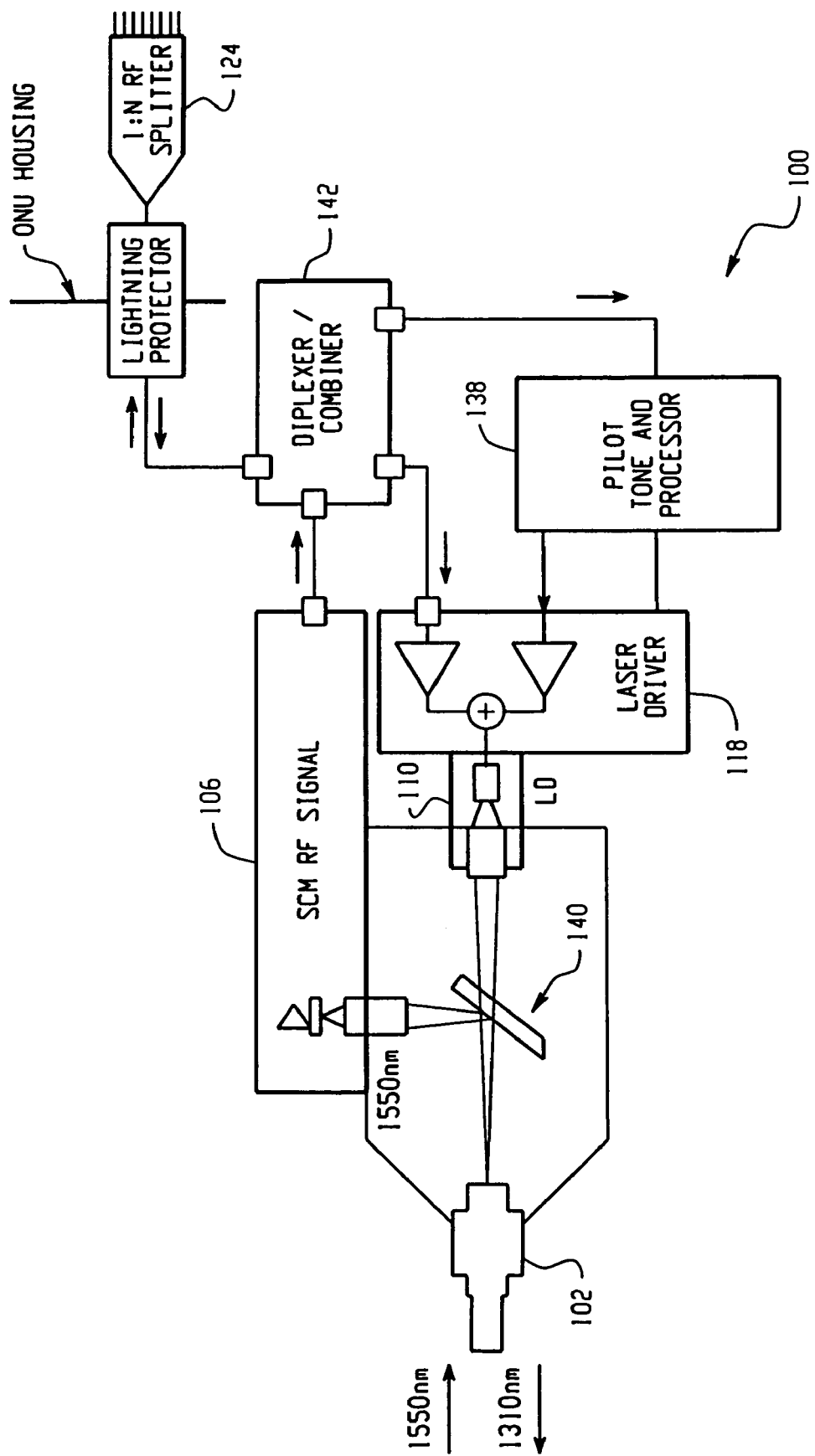
FIG. 10 is a schematic diagram illustrating a third alternative embodiment of an OIU in an ONU.

Referring now to FIG. 10, to provide the ONU with video on demand (VOD) services in addition to high speed data services, but without POTS (such as for use with a cable TV company that does not provide telephonic services), a diplexer/combiner 142 is provided in the ONU OIU 100. High speed data received from the downstream optical signals in the 1550 nm window are directed to the O/E converter 108, which converts the optical signals to electrical signals and forwards the signals to the diplexer/combiner 142. The diplexer/combiner 142 passes the signals to the subscribers via cable and the RF splitter 124 to a cable modem associated with the subscriber. High speed data signals flowing upstream from subscribers are received by the diplexer/combiner 136 and forwarded by the diplexer/combiner 136 to the laser driver 118. The signal output from the laser driver 118 is fed to the laser diode in the E/O converter 110 for conversion to optical signals and for transmission downstream the optical signals in the 1310 nm window to the HDT.

RF signals flowing downstream the optical signals in the 1550 nm window from the HDT, such as cable programming signals, are received and directed to the first O/E converter 106, which converts the optical signals to electrical signals and forwards the signals to the diplexer/combiner 136. RF signals flowing upstream from subscribers are received and directed to the diplexer/combiner 136 and then forwarded to the laser driver 118. The signal output from the laser driver 118 is fed to the laser diode in the E/O converter 110 for conversion to optical signals and for transmission downstream the optical signals in the 1310 nm window to the HDT. A pilot tone and processor 138 is also provided to provide calibration signals to the laser driver 118.

Conclusion

Other variations from these systems and methods should become apparent to one of ordinary skill in the art without departing from the scope of the invention defined by the claims. The preferred embodiments have been described with reference to FTTC HFC systems but the invention described by the claims could be applicable to other network systems.

The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims. It is also to be understood that the invention is not limited to use with FTTC systems unless explicitly limited by the claims.

The following is claimed:

1. A communication system for providing high speed data services to a subscriber using optical fibers, the communication system comprising:
    an optical interface unit in a network node element, the optical interface unit comprising an electrical-to-optical (E/O) circuit, an optical-to-electrical (O/E) circuit, and a first diplexer device, the first E/O circuit being operative to receive first electrical signals, convert the first electrical signals to first optical signals of a first wavelength, and transmit downstream the first optical signals, the first O/E circuit being operative to receive second optical signals of a second wavelength from the diplexer, convert the second optical signals to second electrical signals, and to transmit the second electrical signals upstream, a cross connect unit in the network node element operable to receive the first optical signals from the optical interface unit, the cross connect unit operable to combine the first optical signals with third optical signals of a third wavelength for transport over an optical fiber, the cross connect unit operable to receive the second optical signals from the optical fiber, the cross connect unit operable to provide the second optical signals to the optical interface unit.

2. The system of claim 1 wherein the first electrical signals comprise downstream POTS signals, downstream high bandwidth data, and downstream subcarrier modulated data.

3. The system of claim 2 wherein the second electrical signals comprise upstream POTS signals, upstream high bandwidth data, upstream RF return data, and upstream subcarrier modulated data.

4. The system of claim 3 wherein the upstream POTS signals are in a frequency range of about 0–7.5 MHz, the upstream high bandwidth data is in a frequency range of about 70–90 MHz, the upstream RE return data is in a frequency range of about 9–65 MHz, and the downstream subcarrier modulated data is in a frequency range of about 500–870 Mhz.

5. The system of claim 3 wherein the HDT is located at a central office (CO).

6. The system of claim 2 wherein the downstream POTS signals are in a frequency range of about 0–7.5 MHz, the downstream high bandwidth data is in a frequency range of about 90–110 MHz, and the downstream subcarrier modulated data is in a frequency range of about 500–870 Mhz.

7. The system of claim 1 wherein the first electrical signals comprise downstream high bandwidth data.

8. The system of claim 7 wherein the second electrical signals comprise upstream high bandwidth data.

9. The system of claim 1 wherein the first electrical signals comprise downstream subcarrier modulated data.

10. The system of claim 9 wherein the second electrical signals comprise upstream subcarrier modulated data.

11. The system of claim 1 further comprising a multi-diplexer operable to receive video electrical signals for combination with the first electrical signals and conversion to the first optical signals.

12. The system of claim 11 further comprising a modem operable to receive high speed data from a data source, the modem operable to generate the first electrical signals from the high speed data.

13. The system of claim 1 wherein the network node comprises a host digital terminal (HDT).

14. The system of claim 1 wherein the network node comprises a point-of-presence (POP) in a central office (CO).

15. The system of claim 1 wherein the first wavelength is in the 1310 nano-meter (nm) window, the second wavelength is in the 1310 nm window, and the third wavelength is in the 1550 nm window.

16. The system of claim 1 wherein the first wavelength is in the 1550 nm window, the second wavelength is in the 1550 nm window, and the third wavelength is in the 1550 nm window.

17. The system of claim 1 wherein the first wavelength is in the 1310 nano-meter (nm) window, the second wavelength is in the 1310 nm window, and the third wavelength is in the 1310 nm window.

18. The system of claim 1 wherein the first wavelength is in the 1550 nm window, and the second wavelength is in the 1550 nm window, and the third wavelength is in the 1310 nm window.

19. The system of claim 1 wherein the first and third optical signals are transported downstream to and the second optical signals are provided upstream from an optical node device comprising an optical network unit (ONU).

20. The system of claim 1 wherein the communication system comprises a fiber-to-the-curb (FTTC) system.

* * * * *

UNITED STATES PATENT AND TRADEMARK OFFICE
CERTIFICATE OF CORRECTION

| | |
|---|---|
| PATENT NO. | : 7,035,504 B2 |
| APPLICATION NO. | : 10/832667 |
| DATED | : April 25, 2006 |
| INVENTOR(S) | : George H. BuAbbud |

Page 1 of 1

It is certified that error appears in the above-identified patent and that said Letters Patent is hereby corrected as shown below:

Column 11:
Line 25, after "the upstream" delete "RE" and insert -- RF --.

Signed and Sealed this

Fifteenth Day of July, 2008

JON W. DUDAS
*Director of the United States Patent and Trademark Office*